A press-fit splined connection is provided for joining rotary members (4) and (6) together with member (4) having at least one elongate groove (1) having opposite sidewalls and member (6) having at least one elongate tooth (8) having opposite side walls and operative to register with and be slideably received in groove (10) to provide the splined connection between members (4) and (6).

United States Patent [19]

Storm

[11] Patent Number: 4,875,796

[45] Date of Patent: Oct. 24, 1989

[54] PRESS-FIT SPLINED CONNECTION

[75] Inventor: Eric L. Storm, Bowling Green, Ky.

[73] Assignee: Eaton Corporation, Cleveland, Ohio

[21] Appl. No.: 124,199

[22] Filed: Nov. 23, 1987

[51] Int. Cl.$^4$ ................................................ B25G 3/28
[52] U.S. Cl. ..................................... 403/359; 403/298; 403/395
[58] Field of Search .......................... 403/359, 298, 345

[56] References Cited

U.S. PATENT DOCUMENTS

| | | | |
|---|---|---|---|
| 3,360,961 | 1/1968 | Steiner | 403/359 X |
| 3,373,625 | 3/1968 | Keller | 403/359 X |
| 4,454,922 | 6/1984 | Jamison | 403/359 X |

FOREIGN PATENT DOCUMENTS

| | | | |
|---|---|---|---|
| 2721571 | 11/1977 | Fed. Rep. of Germany | 403/359 |
| 2656946 | 6/1978 | Fed. Rep. of Germany | 403/359 |
| 410805 | 7/1945 | Italy | 403/359 |

Primary Examiner—James T. McCall

Attorney, Agent, or Firm—A. E. Chrow

[57] ABSTRACT

A press-fit splined connection is provided for joining rotary members (4) and (6) together with member (4) having at least one elongate groove (1) having opposite sidewalls and member (6) having at least one elongate tooth (8) having opposite side walls and operative to register with and be slideably received in groove (10) to provide the splined connection between members (4) and (6).

The press-fit is provided by the sidewalls of one of tooth (8) or groove (10) having a sinusoidal configuration to provide convex surfaces (16) that impinge upon the sidewall adjacent thereto either at about the same location or at about one-half period apart with sufficient interference to provide the press-fit between tooth (8) and groove (10). Either of tooth (8) or groove (10) having the sinusoidal configuration preferably includes a straight portion for a predetermined length "L" at either or both of its ends to facilitate assembling members (4) and (6) together.

15 Claims, 3 Drawing Sheets

PRESS-FIT SPLINED CONNECTION

INTRODUCTION

This invention relates generally to a splined connection between two rotary members such as a shaft and a gear or a shaft and a flange and more particularly to a splined connection operative to provide a press-fit between the rotary members by reason of two opposite side walls of either the groove or the tooth of the spline having respective sinusoidal wave configurations of at least one period along their lengths providing at least two convex surfaces that respectively impinge upon opposite side walls of either the tooth or groove with sufficient interference to provide a press-fit between the members.

BACKGROUND OF THE INVENTION

Splines have been used for many years to join rotary members, particularly cylindrical rotary members together. Generally, one member has a plurality of evenly spaced elongate spaces or grooves and the other member has a plurality of elongate teeth registrable with the grooves and operative to be slidingly received in the grooves and spline the two members together.

Such is commonly employed to join a shaft and gear or a shaft and a flange together by providing a central cylindrical opening through the gear surrounded by a plurality of evenly spaced grooves extending through the gear parallel to the axis of the opening and providing a plurality of elongate teeth circumferentially spaced about the end of the shaft that are registrable with and can be slidingly received in the grooves in a manner effective to provide the splined connections therebetween.

Although single keyway type connections well known to those skilled in the art may be used to join two members together, splined connections are preferred where high torque is involved for uniform distribution of load over a greater surface area provided by a plurality of splines.

It has been the general practice in designing splined connections between rotary members to provide sufficient clearance between the teeth and grooves to enable the teeth to be slidingly received within the grooves with reasonable ease. The practice of providing such clearance, however, enables one of the members to rotate or wobble slightly relative the other which may lead to chatter and wear and does not, without some additional securement, secure them from moving axially relative each other.

In view of such, some modifications have been undertaken to provide tighter securement in splined connections such as disclosed in U.S. Pat. No. 3,360,961, the disclosure of which is incorporated herein by reference, which provides a taper in the grooves so that the teeth are wedged more and more tightly as they are urged along the grooves but which may become too tightly wedged making them difficult to separate and which may over stress the teeth and the groove walls.

Another example of providing a tighter splined connection is disclosed in U.S. Pat. No. 4,175,404, the disclosure of which is incorporated by reference. In this case, the teeth are provided with an axially extending straight section of enlarged breadth providing zero clearance or interference fit with the groove and which then decreases according to a prescribed curve to a straight section having a narrower breadth providing positive clearance with the groove. One of the disadvantages, however, is that in interference fit over a straight length may again over stress the teeth and the groove walls and make the members difficult to separate once splined together.

U.S. Pat. No. 3,477,250, the disclosure of which is incorporated herein by reference, discloses a method of tightening splined connections whereby certain of the teeth are provided with positive clearance and others are provided with zero clearance with the groove as a means of providing a tighter fit but which would be extremely difficult and costly to manufacture and control. The patent also discloses that splines may advance helically along the members as well as parallel to their rotational axis.

U.S. Pat. No. 4,292,001, the disclosure of which is incorporated by reference, discloses members formed by helical splines that are further secured together by means of pins extending through the splines parallel to the rotational axis of the members which again, is costly and difficult to manufacture.

Still another example of a method by which to enhance securement between splined members is disclosed in U.S. Pat. No. 4,552,544, the disclosure of which is incorporated herein by reference. In this case, a resilient coating material is provided over the end of the teeth having a protuberance that extends radially outwardly to provide an interference fit with the bottom of the groove which, although proportedly advantageous for balancing the rotating members, would be subject to undue wear and would not particularly eliminate chatter and wobble under high torque conditions.

SUMMARY OF THE INVENTION

Accordingly, it is an object of this invention to provide a press-fit splined connection between two rotary members.

It is another object of this invention to provide a press-fit splined connection between two rotary members that is relatively easy to manufacture and which is effective to minimize or eliminate chatter or wobble between the two under high torque conditions.

It is still another object of the invention to provide a press-fit splined connection between two rotary members to enhance their secured relationship with each other while remaining relatively easy to assemble and disassemble.

DESCRIPTION OF SOME PREFERRED EMBODIMENTS

Figure 1:
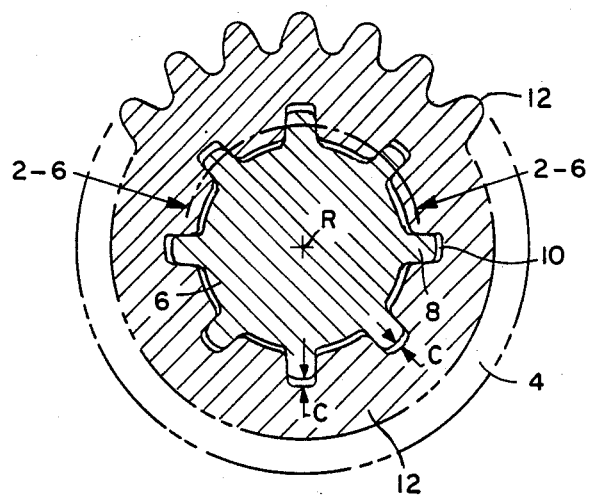
FIG. 1 is a cross-sectional view of two rotary members splined together.

In FIG. 1, first rotary member 4 is spliningly connected to second rotary member 6 with both members 4 and 6 having a common central rotational axis R. Member 4 is a gear having circumferentially spaced external teeth 12 about its periphery. Member 4 has a plurality of spaced-apart substantially parallel elongate grooves 10 in the surface surrounding a cylindrical bore through its center. Member 6 is a shaft having a plurality of spaced-apart substantially parallel elongate teeth 8 about its outer periphery that are registrable with grooves 10 and operable to be slidingly received therein to provide the splined connection between members 4 and 6. Members 4 and 6 need not be cylindrical in the region of the splined connection between the two but, in most instances are, such as where member 4 is a gear and member 6 is a cylindrical shaft.

The means by which the splined connection of the invention is operative to provide a press-fit between members 4 and 6 is hereinafter described in detail with respect to FIGS. 2-6.

Figure 2:
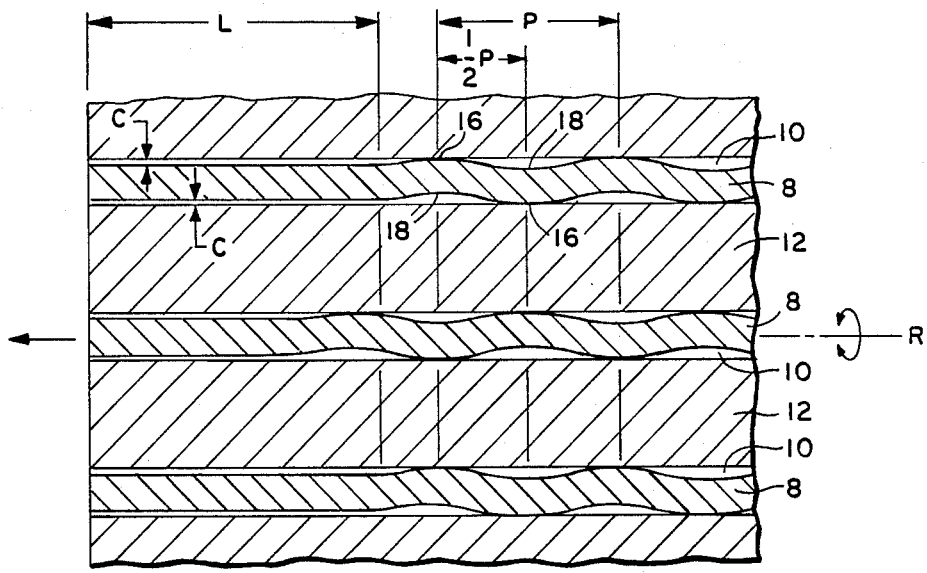
FIGS. 2–6 are respective views along line 2–6 of FIG. 1 showing respective embodiments of the splined connection of the invention.

In FIG. 2, teeth 8 and grooves 10 are both elongate and are disposed in substantial parallel relationship to rotational axis R. Grooves 10 are substantially straight along their entire length and teeth 8 are preferably straight for a predetermined length "L" from an end thereby such that both are straight when teeth 8 are inserted into grooves 10 at the right in FIG. 2 and move towards the viewer's left into the position shown in FIG. 2 as denoted by the arrow. A suitable clearance "c" is provided between the bottom of grooves 10 and the top of teeth 8 as shown in FIG. 1 and between the side walls of teeth 8 and grooves 10 in portion "L" as shown in FIG. 2 to provide a sliding fit between teeth 8 and grooves 10. The straight end portions of teeth 8 denoted by "L" are preferred so that teeth 8 can be slidingly received into grooves 10 prior to establishment of the press-fit between the two resulting from the sinusoidal configuration of teeth 8 hereinafter described as well as preventing cocking when the two are initially joined together. Although shown as extending from one end in FIG. 2, teeth 8 may have straight portions extending from either or both ends for the same or different prescribed lengths "L" depending upon the particular applications involved.

Although the sinusoidal wave configuration of the opposite side walls of each tooth 8 may have any phase relationship relative each other, they are shown in phase with each other in FIG. 2 and of at least one period along the lengths of teeth 8 as denoted by the letter "P" in FIG. 2 to provide at least two convex side wall surfaces 16 on opposite sides of teeth 8 that respectively impinge upon opposite side walls of grooves 10 at about one-half period apart with sufficient interference to provide a press-fit between members 4 and 6.

The concave surfaces 18 of teeth 8 intermediate convex surfaces 16 may have any suitable clearance with the side walls of grooves 10 adjacent thereto such as, for example, clearance "c" hereinbefore with respect to the straight portions denoted by "L."

Although when a plurality of spaced-apart teeth and grooves are used, corresponding side walls of adjacent teeth may have any phase relationship with each other, corresponding side waves of adjacent teeth 8 are preferably about 180° out-of-phase (one-half period "P") with each other and corresponding side walls of alternate teeth 8 are substantially in-phase with each other as shown in FIG. 2 to further minimize cocking when members 4 and 6 are spliningly connected together.

Figure 3:
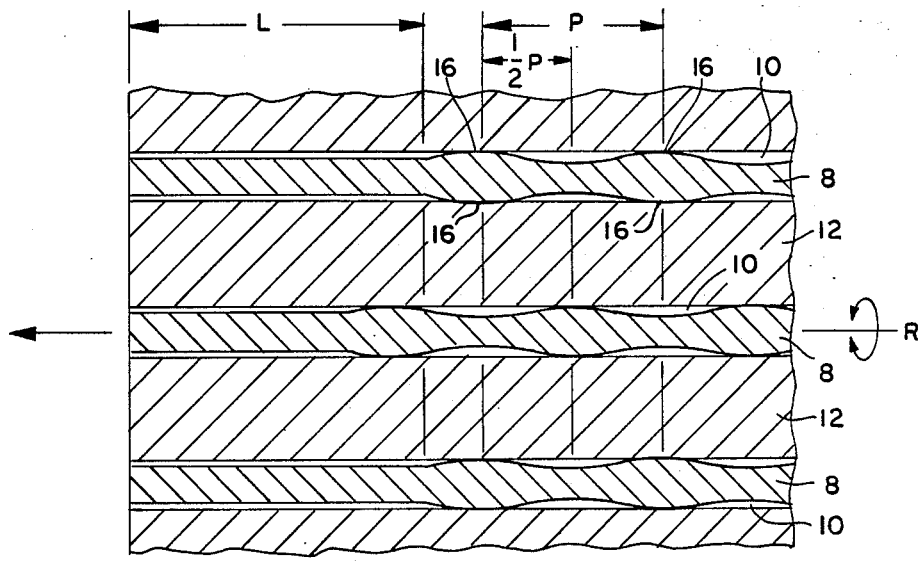

In FIG. 3, grooves 10 are straight and opposite side walls of teeth 8 have sinusoidal wave configurations of at least one period "P" along the length of teeth 8 that are about 180° out-of-phase (one-half "P") with each other to provide at least two convex surfaces 16 on opposite sides of teeth 8 that respectively impinge upon opposite side walls of grooves 10 at about one-half period "P" apart with sufficient interference to provide the press-fit between members 4 and 6. Teeth 8 preferably include straight side walls for a prescribed length "L" at either or both ends as previously described.

Corresponding side walls of adjacent teeth 8 are preferably 180° out-of-phase (one-half period "P") with each other and corresponding side walls of alternate teeth 8 are preferably substantially in phase with each other to minimize cocking, as shown in FIG. 3.

Figure 4:
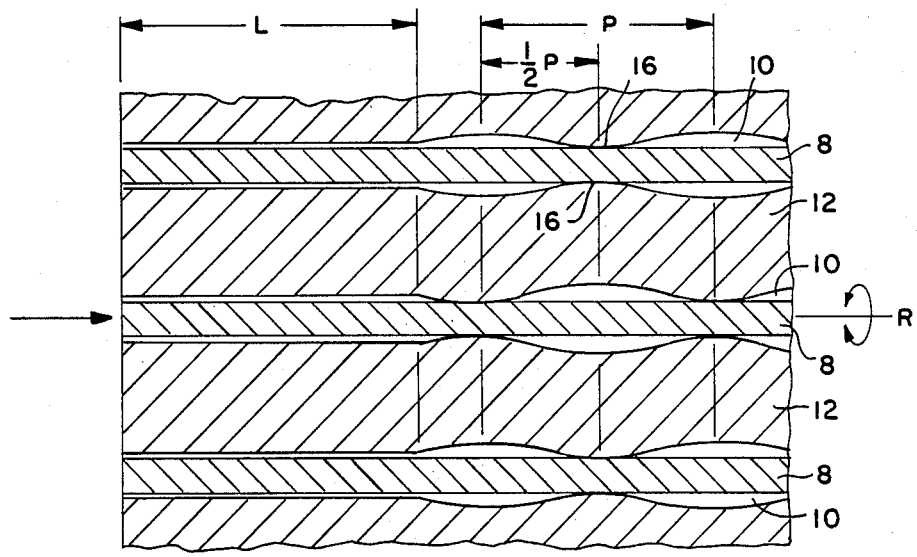

In FIG. 4, teeth 8 are straight with grooves 10 preferably straight for a length "L" at either or both ends as previously described.

Although opposite side walls of grooves 10 have sinusoidal wave configurations of at least one period along the length of grooves 10 that may have any phase relationship with each other, they are preferably about 180° out-of-phase (one-half period "P") providing at least two surfaces 16 that impinge upon opposite side walls of teeth 8 at about the same location along the length of teeth 8 at about one period "P" apart with sufficient interference to provide the press-fit between members 4 and 6. The clearance between the side walls of teeth 8 and grooves 10 at other locations is the same as previously described with respect to FIGS. 1 and 2.

In FIG. 4, corresponding side walls of alternate grooves 10 are substantially in-phase with each other and corresponding side walls of adjacent grooves 10 are at or about 180° out-of-phase with each other (one-half period "P").

The splined connection shown in FIG. 4 is the most preferred since opposed interference forces impinge upon opposite side walls of teeth 10 at about the same location which minimize cocking tendency and deflection of the tooth.

Figure 5:
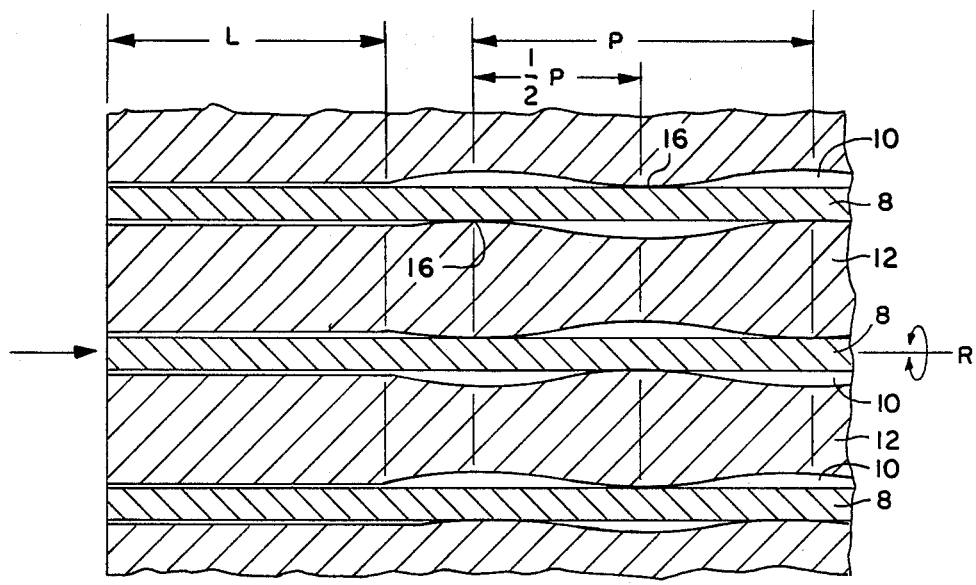

In FIG. 5, teeth 8 are straight over their entire length and grooves 10 are straight for a length "L" with the remaining portion of opposite side walls of each grooves 10 having a sinusoidal wave configuration for at least one period "P" that are substantially in-phase with each other providing at least two convex surfaces 16 that respectively impinge upon opposite side walls of teeth 10 at about one-half period apart with sufficient interference to provide the press-fit between members 4 and 6. A sufficient clearance is provided between the side walls of teeth 8 and grooves 10 at locations other than that of convex surfaces 16 as previously described.

In FIG. 5, corresponding side walls of adjacent grooves 10 are at or about 180° out-of-phase (one-half period "P") with each other and the corresponding side walls of alternate grooves 10 are substantially in-phase with each other.

Figure 6:
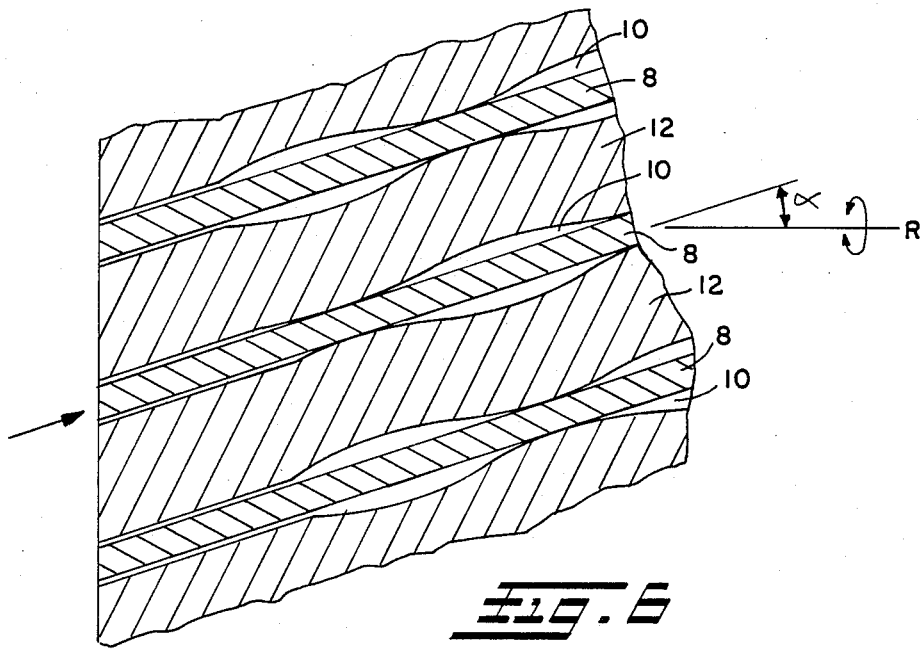

The splined connection shown in FIG. 6 is essentially the same as hereinbefore described with respect to FIG. 4 except that teeth 8 and grooves 10 advance helically about rotational axis "R" at a prescribed angle alpha from axis "R" rather than being substantially parallel to axis "R."

The teeth and grooves employed to provide the splined connection of the invention may have any configuration well known to those skilled in the art such as where the grooves are adapted to spliningly engage with teeth having an involute cross-section.

The sinusoidal wave configurations of the teeth and grooves are preferably formed by providing teeth that have a greater breadth than the grooves by an amount necessary to provide an interference fit.

What is claimed is:

1. A press-fit splined connection between a first rotary member having at least one elongate groove and a second rotary member having at least one elongate tooth operative to register with and be slidingly received within the groove to provide the splined connection between the first and second members, said press-fit provided by the groove having opposite side walls that are substantially straight and at least a portion of the opposite side walls of the tooth having respective sinusoidal wave configurations of at least one period along its length providing at least two convex surfaces that respectively impinge upon the opposite side walls of the groove with sufficient interference to provide the press-fit between the first or second members.

2. A press-fit splined connection between a first rotary member having at least one elongate groove and a second rotary member having at least one elongate tooth operative to register with and be slidingly received within the groove to provide the splined connection between the first and second members, said press-fit provided by the tooth having opposite side walls that are substanitally straight and at least a portion of the opposite side walls of the groove having respective sinusoidal waive configurations of at least one period along its length providing at least two convex surfaces that respectively impinge upon the opposite sides of the tooth with sufficient interference to provide the press-fit between the first and second members.

3. The connection of claim 2 wherein the opposite side walls of the tooth have the sinusoidal wave configurations and they are substantially in-phase with each other such that the convex surfaces impinge upon the groove side walls about one-half period apart.

4. The connection of claim 1 wherein the opposite side walls of the tooth have the sinusoidal wave configuration and they are about 180° out-of-phase with each other such that the convex surfaces impinge upon the groove side walls at about the same location along the length of the groove at about one period apart.

5. The connection of claim 1 wherein the opposite side walls of the groove have the sinusoidal wave configurations and they are about 180° out-of-phase with each other such that the convex surfaces impinge upon the tooth side walls at about the same location along the tooth at about one period apart.

6. The connection of claim 1 wherein the opposite side walls of the groove have the sinusoidal wave configurations and they are substantially in-phase with each other such that the convex surfaces impinge upon the tooth side walls about one-half period apart.

7. The connection of claim 3 having a plurality of the grooves in substantially parallel spaced-apart relationship to each other and a plurality of the teeth in substantially parallel spaced-apart relationship to each other that are registrable with the grooves and corresponding side walls of adjacent teeth have sinusoidal wave configurations that are about 180° out-of-phase with each other and corresponding side walls of alternate teeth have sinusoidal wave configurations that are substantially in-phase with each other.

8. The connection of claim 4 having a plurality of the grooves in substantially parallel spaced-apart relationship to each other and a plurality of the teeth in substantially parallel spaced-apart relationship to each other that are registrable with the grooves and corresponding side walls of adjacent teeth have sinusoidal wave configurations that are about 180° out-of-phase with each other and corresponding side walls of alternate teeth have sinusoidal wave configurations that are substantially in-phase with each other.

9. The connection of claim 5 having a plurality of the grooves in substantially parallel spaced-apart relationship to each other and a plurality of the teeth in substantially parallel spaced-apart relationship to each other that are registrable with the grooves and corresponding side walls of adjacent grooves have sinusoidal wave configurations that are about 180° out-of-phase with each other and corresponding side walls of alternate grooves have sinusoidal wave configurations that are substantially in-phase with each other.

10. The connection of claim 6 having a plurality of the grooves in substantially parallel spaced-apart relationship to each other and a plurality of the teeth in substantially parallel spaced-apart relationship to each other that are registrable with the grooves and corresponding side walls of adjacent grooves have sinusoidal wave configurations that are about 180° out-of-phase with each other and corresponding side walls of alternate grooves have sinusoidal wave configurations that are substantially in-phase with each other.

11. The connection of claim 1 or 2 wherein the first and second members are substantially cylindrical at least at the splined connection therebetween.

12. The connection of claim 2 wherein the tooth includes a substantially straight portion extending for a prescribed length from at least one end.

13. The connection of claim 1 wherein the groove includes a substantially straight portion extending for a prescribed length from from at least one end.

14. The connection of claim 1 or 2 wherein the first and second members have a common rotational axis and the tooth and groove are in substantial parallel alignment therewith.

15. The connection of claim 1 or 2 wherein the first and second members have a common rotational axis and the tooth and groove extend helically thereabout.

* * * * *